H. S. WHEELER.
MEANS FOR COOLING COMBUSTION ENGINES.
APPLICATION FILED MAY 13, 1910.
1,064,581. Patented June 10, 1913.
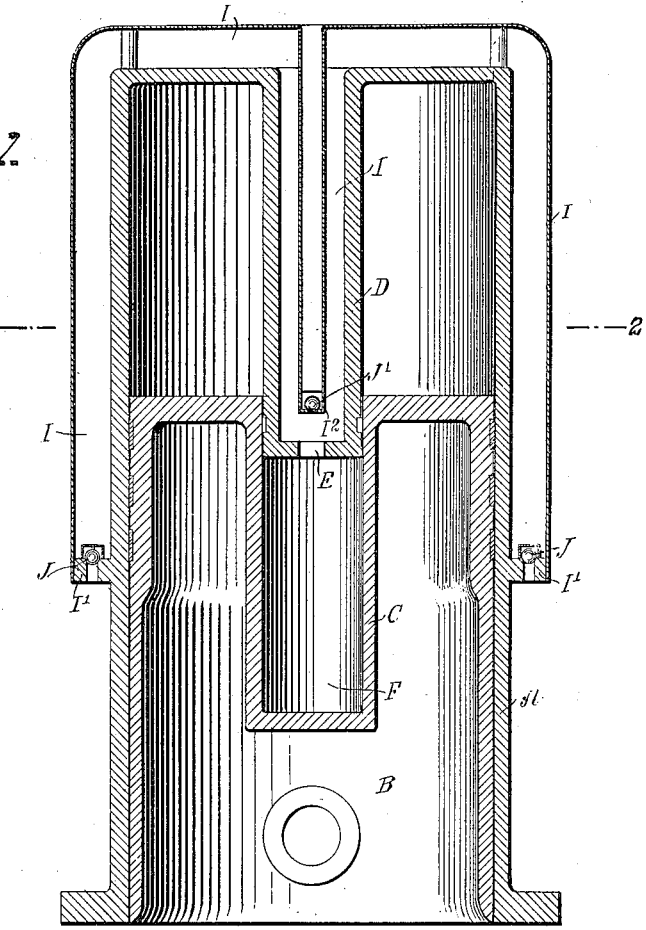
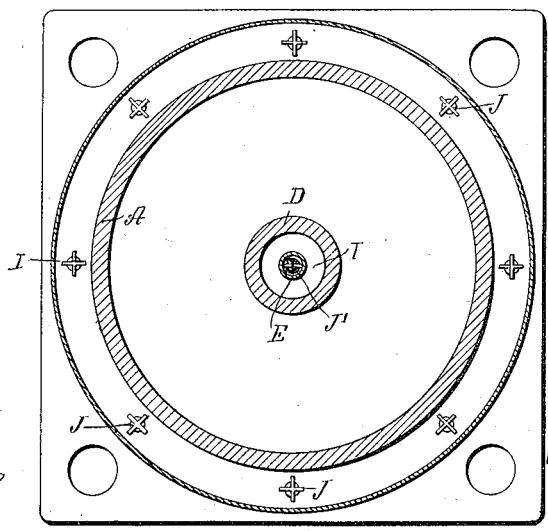
WITNESSES:
INVENTOR
Harold S. Wheeler
BY 
ATTORNEYS

UNITED STATES PATENT OFFICE.

HAROLD S. WHEELER, OF MANISTEE, MICHIGAN.

MEANS FOR COOLING COMBUSTION-ENGINES.

1,064,581.     Specification of Letters Patent.     Patented June 10, 1913.

Application filed May 13, 1910. Serial No. 561,080.

*To all whom it may concern:*

Be it known that I, HAROLD S. WHEELER, a citizen of the United States, and a resident of Manistee, in the county of Manistee and State of Michigan, have invented a new and Improved Means for Cooling Combustion-Engines, of which the following is a full, clear, and exact description.

The invention relates to internal combustion engines, and its object is to provide a new and improved means for cooling the cylinder and piston of an internal combustion engine by the use of atmospheric air or other cooling medium.

For the purpose mentioned, use is made of means, arranged inside of the cylinder and piston of the engine, to circulate a cooling medium through the means.

A practical embodiment of the invention is represented in the accompanying drawings forming a part of this specification, in which similar characters of reference indicate corresponding parts in all the views.

Figure 1 is a sectional side elevation of an internal combustion engine provided with the improved cooling means; and Fig. 2, is a sectional plan view of the same on the line 2—2 of Fig. 1.

In the cylinder A reciprocates the piston B, connected in the usual manner with the crank shaft of the engine, the piston being open at its lower end and forming with the top of the cylinder the usual working chamber, in which the explosive mixture is ignited, to produce the desired power. The piston B is provided with a cylindrical chamber C, extending downward from the top of the piston, as plainly indicated in the drawings, and in the said chamber C extends a tube D depending from the top or head of the cylinder A, the said tube being open at the top and provided at its lower end with a port E opening into the lower end F of the chamber C. Now when the engine is running, the chamber C and the tube D form a means for circulating air which is drawn in through the upper open end of the tube D and circulated through the latter and through the lower end F of the chamber C. The air is drawn in through the upper end of the tube D and again expelled through the same after being circulated in the tube D and the chamber C, thus providing internal cooling means for the cylinder A and the piston B.

If desired, the cylinder A may be surrounded at the sides and top and at the inside of the tube D with a jacket I, opening at the inner end into the port E and open at the outer end, so that when the engine is running air is circulated through the said jacket by the circulating means, consisting of the chamber C and the tube D, whereby the piston B and the cylinder A are cooled inside as well as on the top and sides.

It is understood that the air is drawn into the jacket at its lower end at the outside of the cylinder A, and also expelled through the same, and, if desired, the closed ends I', I² of the jacket at the outside of the cylinder A and at the lower end of the tube D may be provided with valve seats and check valves J, J', to control the inflow and outflow of the air.

It is understood that the chamber C and the tube D form parts of the reciprocating piston B and the cylinder A, and hence no further devices are needed to circulate a cooling medium inside of the cylinder A and the piston B without interfering with the explosive mixture to be ignited in the working chamber of the cylinder A.

It is understood that the usual means are employed for controlling the admission of the explosive mixture and the exhaust of the burned gases as well as the proper igniting devices and other mechanisms usually found in internal combustion engines.

Having thus described my invention, I claim as new and desire to secure by Letters Patent:—

An internal combustion engine having a cylinder head provided with a tube extending into the cylinder and open at its outer end and provided at its inner end with a port, a piston reciprocating in the cylinder and having a chamber within which the tube fits closely, said cylinder having the end adjacent to the said head inclosed with a jacket having inlet and outlet valves.

In testimony whereof I have signed my name to this specification in the presence of two subscribing witnesses.

HAROLD S. WHEELER.

Witnesses:
R. S. HOLT,
R. G. HUDSON.

Copies of this patent may be obtained for five cents each, by addressing the "Commissioner of Patents, Washington, D. C."